(12) United States Patent
Trettin et al.

(10) Patent No.: US 9,403,219 B2
(45) Date of Patent: Aug. 2, 2016

(54) DOOR LOCK INSTALLATION KIT

(71) Applicant: Techtronic Power Tools Technology Limited, Tortola (VG)

(72) Inventors: David Trettin, Atlanta, GA (US); Joseph Palermo, Boynton, FL (US)

(73) Assignee: TECHTRONIC POWER TOOLS TECHNOLOGY LIMITED, Tortola (VG)

( * ) Notice: Subject to any disclaimer, the term of this patent is extended or adjusted under 35 U.S.C. 154(b) by 268 days.

(21) Appl. No.: 14/012,501

(22) Filed: Aug. 28, 2013

(65) Prior Publication Data
US 2014/0064867 A1 Mar. 6, 2014

Related U.S. Application Data

(60) Provisional application No. 61/694,644, filed on Aug. 29, 2012.

(51) Int. Cl.
| | |
|---|---|
| *B23B 47/28* | (2006.01) |
| *B23B 49/02* | (2006.01) |
| *E04F 21/00* | (2006.01) |
| *E05B 17/06* | (2006.01) |

(52) U.S. Cl.
CPC .............. *B23B 47/287* (2013.01); *B23B 49/02* (2013.01); *B23B 47/28* (2013.01); *B23B 49/023* (2013.01); *B23B 2247/06* (2013.01); *E04F 21/003* (2013.01); *E05B 17/06* (2013.01); *Y10T 408/563* (2015.01); *Y10T 408/567* (2015.01); *Y10T 408/568* (2015.01)

(58) Field of Classification Search
CPC .... B23B 2247/06; B23B 47/28; B23B 49/02; B23B 49/023; Y10T 408/567; E05B 17/06; E04F 21/003

USPC .......................................................... 408/185
See application file for complete search history.

(56) References Cited

U.S. PATENT DOCUMENTS

| | | |
|---|---|---|
| 3,021,734 A | 2/1962 | Schlage |
| 3,700,344 A | 10/1972 | Grumbach |
| 4,130,930 A | 12/1978 | Webster |
| 4,199,060 A | 4/1980 | Howard |
| 4,248,554 A | 2/1981 | Boucher et al. |

(Continued)

FOREIGN PATENT DOCUMENTS

| | | |
|---|---|---|
| CN | 2846628 | 12/2006 |
| CN | 200939515 | 8/2007 |

(Continued)

*Primary Examiner* — Daniel Howell
*Assistant Examiner* — Yasir Diab
(74) *Attorney, Agent, or Firm* — Michael Best & Friedrich LLP

(57) ABSTRACT

A door lock installation kit for use with a first standard door width and a second standard door width, each door having a side face and a front face includes a side hole guide including a side hole aperture arranged to abut the side face of the door, a guide housing movably coupled to the side hole guide, and a back housing movably coupled to the side hole guide and arranged such that the back housing and the guide housing are movable to clamp the door and position the guide housing to abut the front face of the door. A front hole guide includes a front hole guide aperture and is movably coupled to the guide housing and movable to one of a first position corresponding to a first door backset and a second position corresponding to a second door backset.

23 Claims, 4 Drawing Sheets

(56) References Cited

U.S. PATENT DOCUMENTS

| | | |
|---|---|---|
| 4,280,776 A | 7/1981 | Chaconas et al. |
| 4,306,823 A | 12/1981 | Nashlund |
| 4,715,125 A | 12/1987 | Livick |
| 4,813,826 A | 3/1989 | Riedel |
| 4,815,215 A | 3/1989 | Saylor et al. |
| 5,046,901 A | 9/1991 | Taylor |
| 5,114,285 A | 5/1992 | Brydon |
| 5,146,961 A | 9/1992 | Schoeller |
| 5,222,845 A | 6/1993 | Goldstein et al. |
| 5,569,001 A | 10/1996 | Brutscher et al. |
| 5,573,352 A | 11/1996 | Matadobra |
| 6,193,449 B1 | 2/2001 | Diaz |
| 6,343,632 B1 | 2/2002 | Zivojinovic |
| 6,390,738 B1 | 5/2002 | Fridman |
| 6,398,465 B1 | 6/2002 | Monge |
| 6,910,837 B2 | 6/2005 | Trettin et al. |
| 6,954,989 B1 | 10/2005 | Morton |
| 6,994,498 B2 | 2/2006 | Trettin et al. |
| D516,401 S | 3/2006 | Snider et al. |
| D516,891 S | 3/2006 | Thomas |
| 7,073,991 B2 | 7/2006 | Thomas |
| 7,112,014 B2 | 9/2006 | Thomas |
| 7,210,880 B2 | 5/2007 | Snider |
| 7,316,527 B2 | 1/2008 | Trettin et al. |
| 7,356,902 B2 | 4/2008 | Snider et al. |
| 7,421,791 B2 | 9/2008 | Adkins et al. |
| 7,530,770 B2 | 5/2009 | Chao |
| 2003/0172535 A1 | 9/2003 | Grizzle |
| 2004/0020809 A1 | 2/2004 | Allan et al. |
| 2005/0072701 A1 | 4/2005 | Allan et al. |
| 2005/0129472 A1 | 6/2005 | Liu et al. |
| 2007/0041800 A1 | 2/2007 | Santos |
| 2007/0086866 A1 | 4/2007 | Shute et al. |
| 2007/0227016 A1 | 10/2007 | Tarter |
| 2011/0064531 A1 | 3/2011 | Osborne |
| 2012/0017452 A1 | 1/2012 | Lam et al. |

FOREIGN PATENT DOCUMENTS

| | | |
|---|---|---|
| FR | 2645576 | 10/1990 |
| GB | 2238749 | 6/1991 |
| WO | WO 2011130900 A1 * | 10/2011 |

* cited by examiner

DOOR LOCK INSTALLATION KIT

RELATED APPLICATION DATA

This application claims priority to U.S. Provisional Application No. 61/694,644 filed Aug. 29, 2012, the entire contents of which are incorporated herein by reference.

BACKGROUND

Doors are often sold without door lock hardware and without the apertures required to install the door lock hardware. Typically, installing the door lock hardware requires the drilling or boring of a front face hole that passes through the door and an end wall hole that is perpendicular to the front face hole and intersects the front face hole. Locating these holes can be difficult and can require a number of measurements. In addition, it can be difficult to position the two holes at the proper elevation.

SUMMARY

In one construction, the invention provides a door lock installation kit for use with a first standard door width and a second standard door width, each door having a side face and a front face. The tool includes a side hole guide including a side hole aperture arranged to abut the side face of the door, a guide housing movably coupled to the side hole guide, and a back housing movably coupled to the side hole guide and arranged such that the back housing and the guide housing are movable to clamp the door and position the guide housing to abut the front face of the door. A front hole guide includes a front hole guide aperture and is movably coupled to the guide housing and movable to one of a first position corresponding to a first door backset and a second position corresponding to a second door backset.

In another construction, the invention provides a door lock installation kit for use with a first standard door width and a second standard door width. The tool includes a side hole guide including a side hole aperture, a first slot, a second slot, a third slot, and a fourth slot and a guide housing including a front hole guide, a first arm arranged to engage the third slot, and a second arm arranged to engage the second slot, the first arm having a first configuration and the second arm having a second configuration different than the first configuration A back arm includes a third arm arranged to engage the first slot, and a fourth arm arranged to engage the fourth slot, the third arm having the second configuration and the fourth arm having the first configuration. The guide housing and the back arm are movable between a first position wherein the guide housing and the back arm abut the side hole guide to define a first width therebetween that is about equal to the first standard width, and a second position wherein the guide housing and the back arm define a second width therebetween that is about equal to the second standard width, and wherein the second arm and the third arm inhibit unwanted movement beyond the second width.

In yet another construction, the invention provides a door lock installation kit for use with a first standard door width and a second standard door width, The tool includes a side hole guide including a side hole aperture that extends along a first axis, a guide housing including a front hole guide, the guide housing movably coupled to the side hole guide, and a back arm movably coupled to the side hole guide and arranged such that the back arm and the guide housing cooperate to define a width, and wherein the back arm and the guide housing are movable between a first position corresponding to the first standard door width and a second position corresponding to the second standard door width. A front hole guide is movably coupled to the guide housing and includes a front hole guide aperture that extends along a second axis that is normal to the first axis, the front hole guide movable to one of a first position corresponding to a first door backset and a second position corresponding to a second door backset. A strike plate locator is connected to the back housing and movable to a position in which the strike plate locator is engageable with a strike plate in a door frame.

Other aspects of the invention will become apparent by consideration of the detailed description and accompanying drawings.

Figure 1:
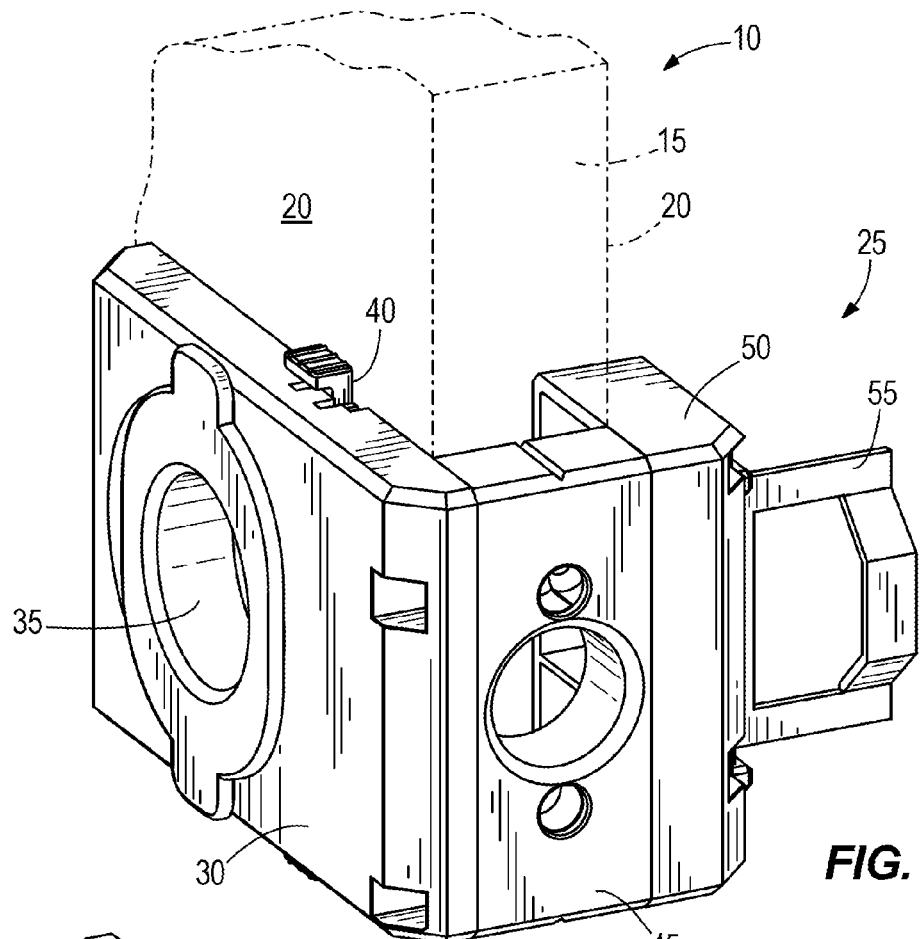
FIG. 1 is a perspective view of a door lock installation kit in a first arrangement embodying the invention.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

DETAILED DESCRIPTION

In order to install door lock hardware into a door 10, a user must properly drill a front hole and a side hole into the door 10. The two holes must be properly positioned and aligned for the door hardware to function as designed. Typically, the side hole is drilled at a proper elevation (i.e., distance above the floor) in the center of a side edge 15 of the door 10. The front hole is drilled at the same elevation through the front and rear faces 20 of the door 10. The center of the front hole is spaced back from the side edge 15 of the door 10 a predetermined backset distance. Two standard backset distances are commonly used with doors 10 (e.g., 2.375 inches and 2.75 inches). In addition, standard doors 10 are typically either 1 inch thick or 0.75 inches thick.

The door lock installation kit 25 (DLIK) can assist an individual while installing a door lockset on doors 10 with various thicknesses and made from many different materials. The DLIK 25 can also accommodate backsets of a variety of distances, with an embodiment capable of accommodating two backsets illustrated herein. The DLIK 25 can be constructed using a variety of materials including but not limited to plastics, steel aluminum, other metals, and composite materials.

Figure 4:
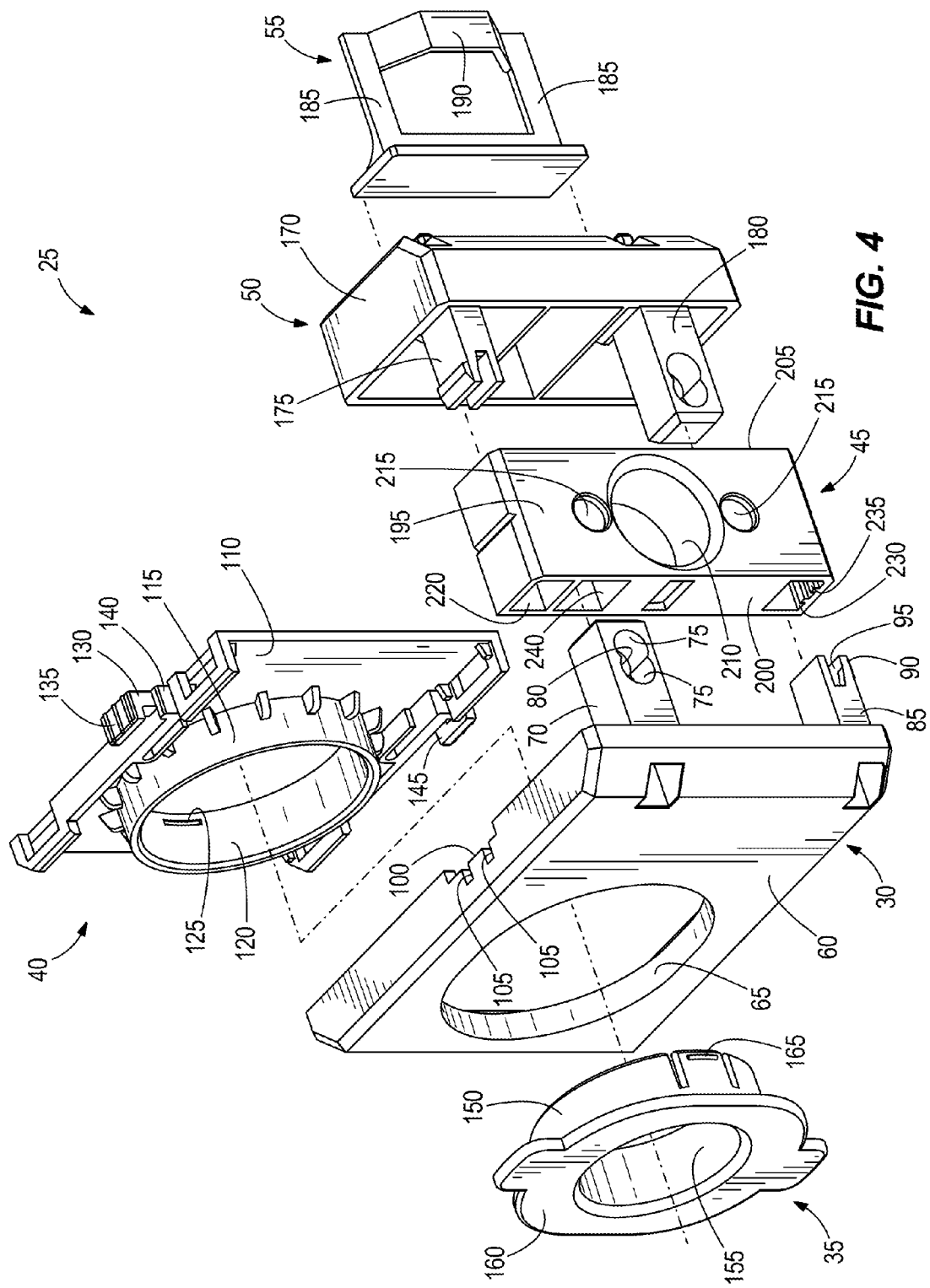
FIG. 4 is an exploded perspective view of the door lock installation kit of FIG. 1.

FIG. 1 illustrates the DLIK 25 or tool for use in locating the holes that must be drilled in the door 10 to install the door lock hardware and that can accommodate the different standard door dimensions. As illustrated in FIG. 4, the DLIK 25 includes a front hole guide housing 30, a front hole guide 35, a guide slide 40, a side hole guide 45, a back arm 50, and a strike plate locator 55.

Figure 5:
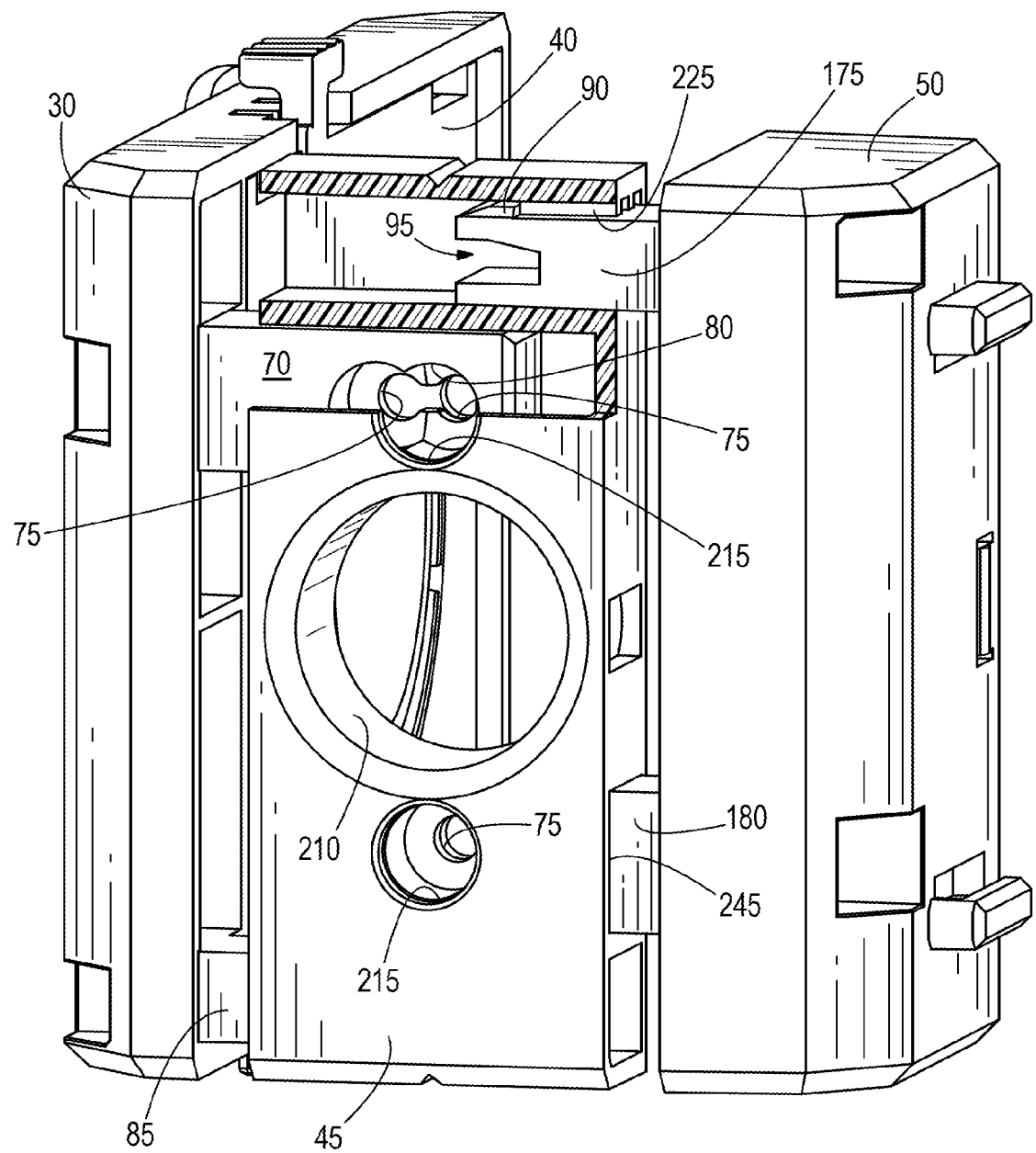
FIG. 5 is a partially broken away view of a portion of the door lock installation kit of FIG. 1.

The front hole guide housing 30 includes a substantially rectangular body 60 that extends substantially within a plane that, during use of the DLIK 25 is parallel to the front face 20 of the door 10. A large aperture 65 is formed in the front hole guide housing 30. In the illustrated construction, the aperture 65 is oval-shaped with other shapes and arrangements being possible. A first arm 70 extends from the rectangular body 60 along an axis that is substantially normal to the body 60. The first arm 70 has a first configuration that includes a rectangular cross-section and two apertures 75 that pass through the first arm 70. The two apertures 75 are arranged such that they overlap one another to create a single FIG. 8 shaped aperture 80 that is best illustrated in FIG. 5. As illustrated, the two apertures 75 include cylindrical bores 75a with counterbores 75b that overlap to define the FIG. 8 shape 80. A second arm 85 extends from the rectangular body 60 along an axis that is substantially normal to the body 60. The second arm 85 has a second configuration that includes a rectangular cross-section and a hook 90 at a free end. A slot 95 is formed at the end adjacent the hook 90 to provide some flexibility to allow the hook 90 to deflect inward. The front hole guide housing 30 also includes a recess portion 100 and two slots 105 formed on each of the long edges of the rectangular body 60.

In preferred constructions, the rectangular body 60, the first arm 70, and the second arm 85 are formed as a single component. However, other constructions may include arms 70, 85 that attach to the rectangular body 60.

Returning to FIG. 4, the guide slide 40 includes a rectangular body portion 110 that extends in a plane approximately parallel to the front surface 20 of the door 10. A cylindrical wall 115 extends in a direction normal to the rectangular body portion 110 to define a circular aperture 120 that extends through the rectangular body portion 110 with other shapes being possible. The cylindrical wall 115 includes a pair of slots 125 that extend around a portion of the circumference of the cylindrical wall 115. A first tab member 130 is formed along the long edge of the rectangular body portion 110 and includes a finger engagement surface 135 and a key portion 140. The first tab member 130 is movable between an engaged position and a disengaged position when a user applies pressure to the finger engagement surface 135. A second tab member 145 is formed opposite the first tab member 130. In preferred constructions, the rectangular body portion 110, the cylindrical wall 115, the first tab member 130, and the second tab member 145 are formed as a single component. However, other constructions are possible.

The front hole guide 35 includes a cylindrical portion 150 that defines a hole 155 sized to guide a hole saw or drill bit during the process of cutting or drilling the front hole. A flange 160 extends around the cylindrical portion 150 and defines the outermost surface of the front hole guide 35. The cylindrical portion 150 is sized to pass through the aperture 65 in the front hole guide housing 30 while the flange 160 is sized to inhibit the passage of the front hole guide 35 through the aperture 65. Two tabs 165 are formed in the cylindrical portion 150 and are arranged to engage the slots 125 of the guide slide 40 as will be discussed.

With continued reference to FIG. 4, the back arm 50 is a substantial mirror image of a portion of the front hole guide housing 30. The back arm 50 includes a body portion 170 that supports a third arm 175 and a fourth arm 180. The third arm 175 has the same configuration as the second arm 85 of the front hole guide housing 30 and the fourth arm 180 has the same configuration as the first arm 70 of the front hole guide housing 30. The four arms 70, 85, 175, 180 are arranged on opposite corners such that the first arm 70 is located near the uppermost corner of the front hole guide housing 30 and the fourth arm 180 is located near the lowermost corner of the back arm 50. The second arm 85 is located near the lowermost corner of the front hole guide housing 30 while the third arm 175 is located near the uppermost corner of the back arm 50.

Figure 6:
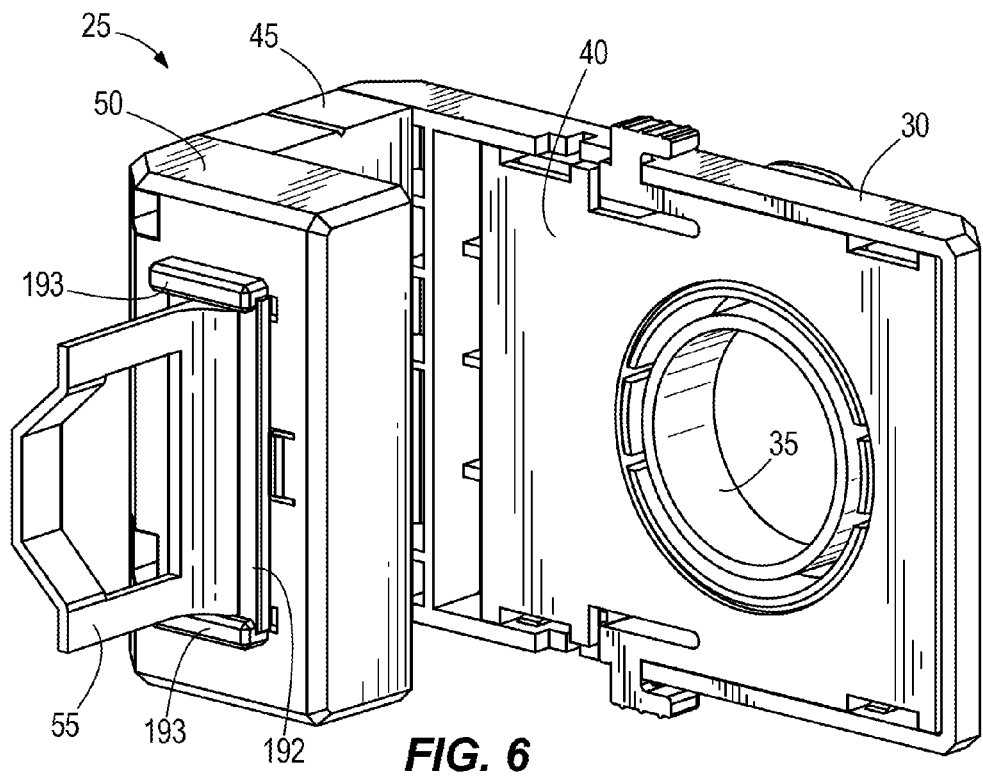
FIG. 6 is another perspective view of the door lock installation kit of FIG. 1 in the second arrangement.

In some constructions, the strike plate locator 55 is formed as part of the back arm 50 or attaches to the back arm 50 as illustrated in FIG. 4 and FIG. 6. In the illustrated construction, the strike plate locator 55 includes a pair of arms 185 that support a trapezoidal cross member 190. The cross member 190 is sized to engage a strike plate to position the DLIK 25 at the proper level above the floor as will be discussed in greater detail. The arms 185 engage a base 192 that is sized to slide into a pair of shoulders 193 which hold the strike plate locator 55 in the desired position.

The side hole guide 45 includes a substantially rectangular block 195 that includes a first elongated side 200 and a second elongated side 205. A large aperture 210 is formed in the rectangular block 195 and is preferably centered between the first side edge 200 and the second side edge 205. Two smaller apertures 215 are formed adjacent the large aperture 210 and extend in a direction parallel to the large aperture 210. A first slot 220 is positioned near the top of the rectangular block 195 and extends from the first side 200 through to the second side 205. The slot 220 includes a rectangular cross-section sized to receive the third arm 175. A lock member 225 is formed within the first slot 220 (shown in FIG. 5) and is sized to engage the hook 90 of the third arm 175. A second slot 230 is positioned near the bottom of the rectangular block 195 and extends from the second side 205 through to the first side 200. The slot 230 includes a rectangular cross-section sized to receive the second arm 85. A lock member 235 is formed within the second slot 230 and is sized to engage the hook 90 of the second arm 85. The lock member 235 of the first slot 220 and the second slot 230 are formed on opposite ends of the respective slots 220, 230 as illustrated in FIG. 4. A third slot 240 extends from the first side 200 toward the second side 205 just below the first slot 220. The third slot 240 is substantially rectangular and intersects with one of the small apertures 215 adjacent the large aperture 210. The fourth slot 245 extends from the second side 205 toward the first side 200 and is positioned just above the second slot 230. The fourth slot 245 is rectangular in cross section and intersects the second small aperture 215 adjacent the large aperture 210.

With continued reference to FIG. 4, the DLIK 25 is assembled by first positioning the cylindrical wall 115 of the guide slide 40 within the large aperture 65 of the front hole guide housing 30. The tabs 130, 145 of the guide slide 40 fit within the recess portions 100 with the key portion 140 fitting within one of the two slots 105. The front hole guide 35 is then inserted into the large aperture 65 of the front hole guide housing 30 and into the aperture 120 defined by the cylindrical wall 115. The tabs 165 of the cylindrical portion 150 of the front hole guide 35 engage the slots 125 of the cylindrical wall 115 to lock the front hole guide 35 to the guide slide 40 with the front hole guide housing 30 sandwiched therebetween. The key portions 140 of the tabs 130, 145 lock the position of the front hole guide 35 in one of two backset positions and are movable between those positions as will be discussed.

The front hole guide housing 30 is then connected to the side hole guide 45. The first arm 70 is inserted into the third slot 240 and freely slides within the third slot 240. The second arm 85 is inserted into the second slot 230 by pushing the hook 90 beyond the lock member 235 formed in the second slot 230. Once passed, the hook 90 snaps outward and engages the lock member 235 (see FIG. 5) to inhibit the unwanted separation of the front hole guide housing 30 and the side hole guide 45.

The back arm 50 is then connected to the side hole guide 45. The fourth arm 180 is inserted into the fourth slot 245 and freely slides within the fourth slot 245. The third arm 175 is inserted into the first slot 220 by pushing the hook 90 of the third arm 175 beyond the lock member 235 formed in the first slot 220. Once passed, the hook 90 snaps outward and engages the lock member 235 (see FIG. 5) to inhibit the unwanted separation of the back arm 50 and the side hole guide 45.

The use of the DLIK 25 will be described with reference to FIGS. 1-3. FIG. 1 illustrates the DLIK 25 in a first configuration in which the front hole guide housing 30 and the back arm 50 are arranged to accommodate the narrowest of the two standard door widths. In this arrangement, the front hole guide housing 30 and the back arm 50 are pushed into an abutting position with respect to the side hole guide 45. In this position, one aperture 75 of the FIG. 8 shaped aperture 80 of the first arm 70 aligns with one of the small apertures 215 in the side hole guide 45. The user can insert a pin through the two holes 75, 215 to lock the position of the front hole guide housing 30 and the side hole guide 45. Similarly, the aperture 75 in the fourth arm 180 aligns with the other of the small apertures 215. The user can insert a second pin in the second aperture 75 and small aperture 215 to lock the position of the back arm 50 with respect to the side hole guide 45. In other constructions, screws pass through the small apertures 215 and the apertures 75 and engage the door 10 to attach the DLIK 25 to the door 10.

Returning to FIG. 1, the front hole guide slide 40 is shown positioned in a first standard backset position. As illustrated, the key portion 140 is disposed within the slot 105 closest to the side hole guide 45 to lock the position of the front hole guide 35.

Figure 2:
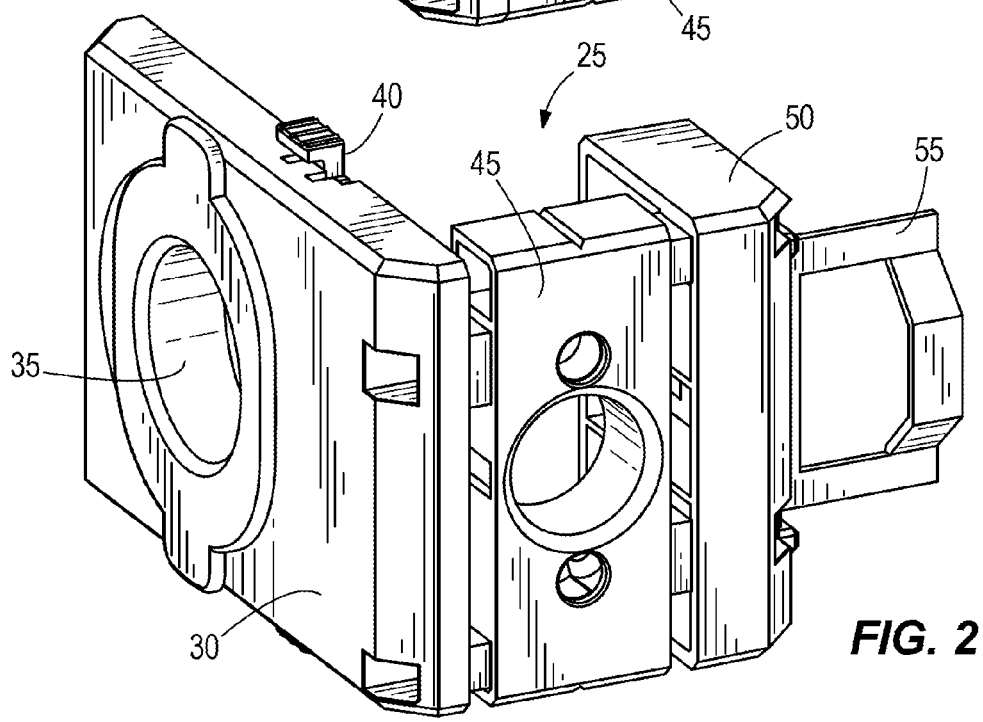
FIG. 2 is a perspective view of the door lock installation kit of FIG. 1 in a second arrangement.

FIG. 2 illustrates the DLIK 25 in a second configuration that allows the DLIK 25 to accommodate a door 10 having a second standard width that is wider than the first. In this position, the front hole guide housing 30 and the back arm 50 are spaced apart from the side hole guide 45. As illustrated in FIG. 5, the hooks 90 engage, or are close to engaging the lock member 225, 235 in this position to inhibit further expansion of the DLIK 25. In the second configuration, the second aperture 75 of the FIG. 8 shaped aperture 80 of the first arm 70 aligns with one of the small apertures 215 of the side hole guide 45 for receipt of the pin. With the pin inserted, the position of the front hole guide housing 30 is locked with respect to the side hole guide 45. Similarly, the second aperture 75 of the FIG. 8 shaped aperture 80 of the fourth arm 180 aligns with the other small aperture 215 for the receipt of a pin. With the pin installed, the position of the back arm 50 is fixed with respect to the side hole guide 45.

Figure 3:
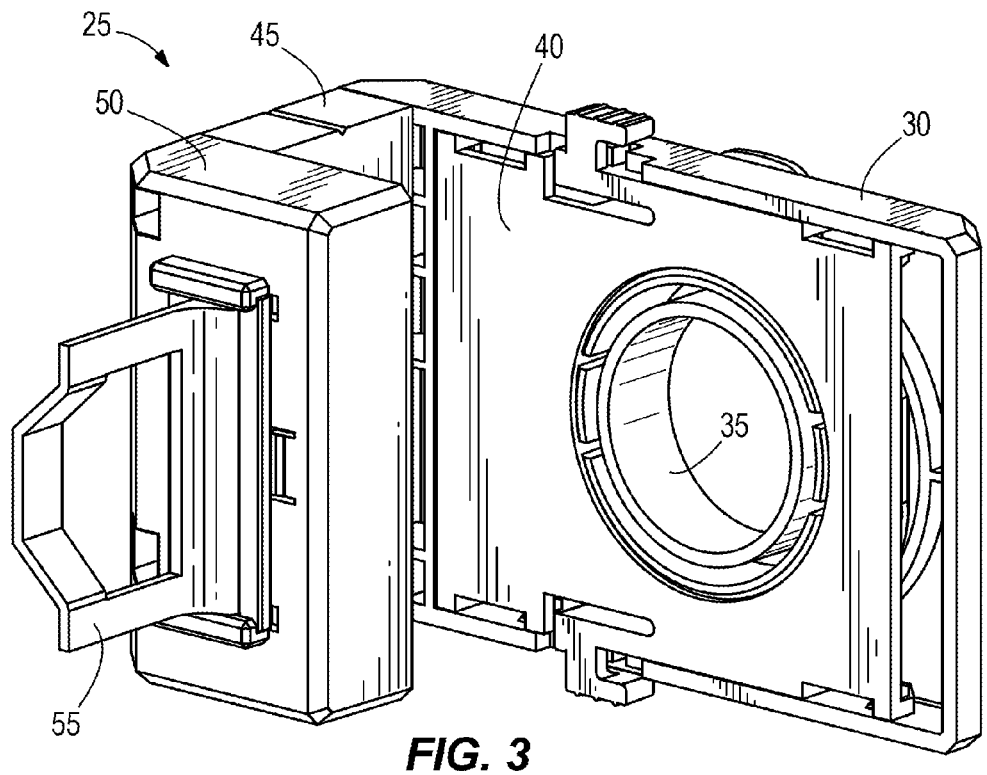
FIG. 3 is another perspective view of the door lock installation kit of FIG. 1 in the first arrangement.

FIGS. 2 and 3 also illustrate the front hole guide slide 40 in a second backset position that is different than the first. Specifically, the second backset position is further back from the side hole guide 45 than the first backset position. In this position, the key portion 140 engages the second slot 105 to lock the guide slide 40 and the front hole guide 35 in the desired position.

To use the DLIK 25, the user first positions the DLIK 25 in one of the two door width positions corresponding with the door 10 to which the lock hardware is being installed. The user than positions the guide slide 40 in the proper position for the desired backset. The DLIK 25 is then positioned on the door 10 and the strike plate locator 55 is extended. The strike plate locator 55 is aligned with the strike plate to position the DLIK 25 at the proper elevation on the door 10. The user than drills, or marks the location to be drilled for the front hole and the side hole to complete the preparation of the door 10 for the installation of the door lock hardware.

The DLIK 25 can be used to accommodate a variety of door thicknesses and lock backsets. FIG. 1 demonstrates one possible configuration where the DLIK 25 is set for a door width that is a minimum and the lock backset is set to a minimum distance. After the DLIK 25 is secured to the door 10 the user would, in no particular order, drill the side hole and then the front hole. After holes have been drilled, the user would remove the screws or pins and then remove the DLIK 25 from the door 10.

FIG. 2 demonstrates another possible door thickness and lock backset setting. In this embodiment, the DLIK 25 is set to accommodate a door width that is a maximum, and the lock backset is set to a maximum distance. After the DLIK 25 is secured to the door 10 the user would, in no particular order, drill the side hole and the front hole. After the holes have been drilled the user would remove the screws or pins and then remove the DLIK 25 from the door 10.

Various features and advantages of the invention are set forth in the following claims.

What is claimed is:

1. A door lock installation tool for use with a first standard door width and a second standard door width, each door having a side face and a front face, the tool comprising:
    a side hole guide including a side hole aperture arranged to abut the side face of the door;
    a guide housing movably coupled to the side hole guide;
    a back housing movably coupled to the side hole guide and arranged such that the back housing and the guide housing are movable to clamp the door and position the guide housing to abut the front face of the door;
    a front hole guide including a front hole guide aperture, the front hole guide movably coupled to the guide housing and movable to one of a first position corresponding to a first door backset and a second position corresponding to a second door backset;
    wherein the side hole aperture defines a first axis, the side hole guide further comprising a first slot, a second slot, a third slot, and a fourth slot each arranged to extend along axes that are normal to the first axis.

2. The door lock installation tool of claim 1, wherein the first slot includes a first stop formed at a first end and the second slot includes a second stop formed at a second end opposite the first end.

3. The door lock installation tool of claim 1, wherein the guide housing includes a first arm having a first configuration arranged to engage the third slot and a second arm having a second configuration arranged to engage the second slot, wherein the second configuration is different than the first configuration.

4. The door lock installation tool of claim 3, wherein the back arm includes a third arm having the second configuration arranged to engage the first slot and a fourth arm having the first configuration arranged to engage the fourth slot.

5. The door lock installation tool of claim 4, wherein each of the first arm and the fourth arm includes an aperture arranged to receive a pin to lock the guide housing and the back arm respectively in one of a first position to clamp to a door having the first standard door width and a second position to clamp to a door having the second standard door width.

6. The door lock installation tool of claim 4, wherein the first slot includes a first stop formed at a first end and the second slot includes a second stop formed at a second end opposite the first end, and wherein each of the second arm and the third arm includes a hook arranged to engage the respective stop.

7. A door lock installation tool for use with a first standard door width and a second standard door width, each door having a side face and a front face, the tool comprising:
- a side hole guide including a side hole aperture arranged to abut the side face of the door;
- a guide housing movably coupled to the side hole guide;
- a back housing movably coupled to the side hole guide and arranged such that the back housing and the guide housing are movable to clamp the door and position the guide housing to abut the front face of the; and
- a front hole guide including a front hole guide aperture, the front hole guide movably coupled to the guide housing and movable to one of a first position corresponding to a first door backset and a second position corresponding to a second door backset, wherein one of the guide housing and the front hole guide includes two slots and the other of the guide housing and the front hole guide includes a key portion sized to engage the slots, and wherein the slots are positioned to position the front hole guide in one of the first position and the second position.

8. The door lock installation tool of claim 1, further comprising a strike plate locator connected to the back housing and movable to a position in which the strike plate locator is engageable with a strike plate in a door frame.

9. A door lock installation tool for use with a first standard door width and a second standard door width, the tool comprising:
- a side hole guide including a side hole aperture, a first slot, a second slot, a third slot, and a fourth slot;
- a guide housing including a front hole guide, a first arm arranged to engage the third slot, and a second arm arranged to engage the second slot, the first arm having a first configuration and the second arm having a second configuration different than the first configuration; and
- a back arm including a third arm arranged to engage the first slot, and a fourth arm arranged to engage the fourth slot, the third arm having the second configuration and the fourth arm having the first configuration, the guide housing and the back arm movable between a first position wherein the guide housing and the back arm abut the side hole guide to define a first width therebetween that is about equal to the first standard width, and a second position wherein the guide housing and the back arm define a second width therebetween that is about equal to the second standard width, and wherein the second arm and the third arm inhibit unwanted movement beyond the second width.

10. The door lock installation tool of claim 9, wherein the side hole aperture defines a first axis, and wherein the first slot, the second slot, the third slot, and the fourth slot are each arranged to extend along axes that are normal to the first axis.

11. The door lock installation tool of claim 10, wherein the first slot includes a first stop formed at a first end and the second slot includes a second stop formed at a second end opposite the first end.

12. The door lock installation tool of claim 11, each of the second arm and the third arm includes a hook arranged to engage the respective stop.

13. The door lock installation tool of claim 9, wherein each of the first arm and the fourth arm includes an aperture arranged to receive a pin to lock the guide housing and the back arm respectively in one of a first position to clamp to a door having the first standard door width and a second position to clamp to a door having the second standard door width.

14. The door lock installation tool of claim 9, further comprising a front hole guide including a front hole guide aperture, the front hole guide movably coupled to the guide housing and movable to one of a first position corresponding to a first door backset and a second position corresponding to a second door backset.

15. The door lock installation tool of claim 9, wherein one of the guide housing and the front hole guide includes two slots and the other of the guide housing and the front hole guide includes a key portion sized to engage the slots.

16. The door lock installation tool of claim 9, further comprising a strike plate locator connected to the back housing and movable to a position in which the strike plate locator is engageable with a strike plate in a door frame.

17. A door lock installation tool for use with a first standard door width and a second standard door width, the tool comprising:
- a side hole guide including a side hole aperture that extends along a first axis;
- a guide housing including a front hole guide, the guide housing movably coupled to the side hole guide;
- a back arm movably coupled to the side hole guide and arranged such that the back arm and the guide housing cooperate to define a width, and wherein the back arm and the guide housing are movable between a first position corresponding to the first standard door width and a second position corresponding to the second standard door width;
- a front hole guide movable coupled to the guide housing and including a front hole guide aperture that extends along a second axis that is normal to the first axis, the front hole guide movable to one of a first position corresponding to a first door backset and a second position corresponding to a second door backset; and
- a strike plate locator connected to the back housing and movable to a position in which the strike plate locator is engageable with a strike plate in a door frame;
- wherein the side hole guide further comprises a first slot, a second slot, a third slot, and a fourth slot each arranged to extend along axes that are normal to the first axis.

18. The door lock installation tool of claim 17, wherein the first slot includes a first stop formed at a first end and the second slot includes a second stop formed at a second end opposite the first end.

19. The door lock installation tool of claim 17, wherein the guide housing includes a first arm having a first configuration arranged to engage the third slot and a second arm having a second configuration arranged to engage the second slot, wherein the second configuration is different than the first configuration.

20. The door lock installation tool of claim 19, wherein the back arm includes a third arm having the second configuration arranged to engage the first slot and a fourth arm having the first configuration arranged to engage the fourth slot.

21. The door lock installation tool of claim 20, wherein each of the first arm and the fourth arm includes an aperture arranged to receive a pin to lock the guide housing and the back arm respectively in one of a first position to clamp to a door having the first standard door width and a second position to clamp to a door having the second standard door width.

22. The door lock installation tool of claim 20, wherein the first slot includes a first stop formed at a first end and the second slot includes a second stop formed at a second end opposite the first end, and wherein each of the second arm and the third arm includes a hook arranged to engage the respective stop.

23. A door lock installation tool for use with a first door having a first standard door width and a second door having a second standard door width different than the first standard door width, each of the first door and the second door including a door edge, the tool comprising:
- a side hole guide including a side hole aperture that extends along a first axis;
- a guide housing including a front hole guide, the guide housing movably coupled to the side hole guide;
- a back arm movably coupled to the side hole guide and arranged such that the back arm and the guide housing cooperate to define a width, and wherein the back arm and the guide housing are each movable to one of a first position corresponding to the first standard door width and a second position corresponding to the second standard door width, and wherein when the back arm and the guide housing are in the first position, the side hole aperture is automatically centered on the edge of the first door and when the back arm and the guide housing are in the second position, the side hole aperture is automatically centered on the edge of the second door, and wherein the back arm and the guide housing each slide linearly between the first position and the second position;
- a front hole guide movable coupled to the guide housing and including a front hole guide aperture that extends along a second axis that is normal to the first axis, the front hole guide movable to one of a first position corresponding to a first door backset and a second position corresponding to a second door backset; and
- a strike plate locator connected to the back arm and movable to a position in which the strike plate locator is engageable with a strike plate in a door frame, wherein one of the guide housing and the front hole guide includes two slots and the other of the guide housing and the front hole guide includes a key portion sized to engage the slots, and wherein the slots are positioned to position the front hole guide in one of the first position and the second position.

* * * * *